(12) United States Patent
Tepool (10) Patent No.: US 12,448,154 B2
(45) Date of Patent: Oct. 21, 2025

(54) SYSTEM COMPRISING A DECELERATION POOL WITH A LANDING HOOK SYSTEM DISPOSED ABOVE IT FOR RECEIVING A LANDING ROCKET

(71) Applicant: Blue Origin Manufacturing, LLC, Huntsville, AL (US)

(72) Inventor: John Eric Tepool, Owens Cross Roads, AL (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

(21) Appl. No.: 18/542,459

(22) Filed: Dec. 15, 2023

(65) Prior Publication Data

US 2025/0197034 A1 Jun. 19, 2025

(51) Int. Cl.
  *B64G 5/00* (2006.01)
  *E04H 4/12* (2006.01)
  *B64G 1/00* (2006.01)

(52) U.S. Cl.
  CPC ............ *B64G 5/00* (2013.01); *E04H 4/1209* (2013.01); *B64G 1/006* (2023.08)

(58) Field of Classification Search
  CPC ... B64G 5/00; B64G 1/006; B64F 1/02; B64F 1/36; E04H 4/0075
  See application file for complete search history.

(56) References Cited

U.S. PATENT DOCUMENTS

| | | | |
|---|---|---|---|
| 2003/0108387 A1 | 6/2003 | Airikkala et al. | |
| 2012/0255112 A1* | 10/2012 | Osterman | E04H 4/0006 4/491 |
| 2013/0037972 A1* | 2/2013 | Cunningham | A61H 33/02 261/75 |
| 2016/0311556 A1* | 10/2016 | Knudsen | B64G 1/625 |

(Continued)

FOREIGN PATENT DOCUMENTS

| | | |
|---|---|---|
| CN | 107323621 | 11/2017 |
| CN | 109484597 | 3/2019 |

(Continued)

OTHER PUBLICATIONS

NASA: Nasa Langley to Break Ground on Hydro Impact Basin, Jun. 8, 2010, available at https://www.nasa.gov/image-article/hydro-impact-basin-groundbreaking/ (accessed Dec. 15, 2023).

*Primary Examiner* — Magdalena Topolski
*Assistant Examiner* — Shanna Danielle Glover
(74) *Attorney, Agent, or Firm* — Knobbe, Martens, Olson & Bear, LLP (57) ABSTRACT

A recovery system for receiving rockets upon landing comprising a deceleration pool filled with liquid. The system may have a volume filled with the liquid having a desired density profile. An injection manifold injects gas into the liquid to create the density profile. The liquid may have a first density at a landing region of the pool and a second density greater than the first density away from the landing region, such as increasing in density radially outward from a center of the landing region. The pool may be located (Continued)

under a primary landing system intended to secure the landing rocket, such as a hook catch. The pool may be a contingency system for mitigating damage to a landing rocket that unsuccessfully attempts securing with the primary landing system.

20 Claims, 3 Drawing Sheets

(56) References Cited

U.S. PATENT DOCUMENTS

| | | |
|---|---|---|
| 2018/0178930 A1* | 6/2018 | Grose ................ B64G 5/00 |
| 2022/0017242 A1 | 1/2022 | Argemi et al. |
| 2022/0135259 A1 | 5/2022 | Knudsen et al. |

FOREIGN PATENT DOCUMENTS

| | | |
|---|---|---|
| CN | 110510139 | 11/2019 |
| CN | 113371219 | 9/2021 |

* cited by examiner

SYSTEM COMPRISING A DECELERATION POOL WITH A LANDING HOOK SYSTEM DISPOSED ABOVE IT FOR RECEIVING A LANDING ROCKET

FIELD

This disclosure relates to rockets, in particular to systems for safely recovering rocket stages upon landing.

DESCRIPTION OF THE RELATED TECHNOLOGY

Rockets are used for many applications, including as a first or second stage rocket for propelling launch vehicles into space, and other uses. For example, a launch system may jettison rockets during flight. Traditionally, these jettisoned rockets freefall back to earth and are damaged beyond subsequent use, rendering them single-use components. Accordingly, launching rockets and corresponding components is expensive due to their limited use.

Attempts have been made to create rockets, such as reusable rockets, that can land back on earth after use. Some Most existing rockets comprise landing gear deployed at the base of the rocket to stabilize the rocket upright on a solid landing pad. The landing gear components accompany these existing rockets throughout an entire mission and provide additional mass to the rocket consequently requiring additional fuel to propel the rocket for the duration of the mission. Operating a rocket without landing gear reduces mass and can increase the efficiency of the fuel consumption of the rocket. Additionally, eliminating landing gear from rockets may simplify the design of any rocket.

However, during landing, rockets are subject to external and internal forces including wind, inadequate deceleration, combustion, and buckling of the landing gear. Similarly, removing landing gear from the rocket presents additional challenges since the rocket is dependent upon the successful interaction between the descending rocket and a system external to the rocket for securing the rocket. Accordingly, successfully landing a rocket is uncertain and presents a substantial risk of damage to the rocket. It is therefore desirable to improve the safety and reliability of landing systems for mitigating damage to rockets.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description" one will understand how the features of the embodiments described herein provide advantages to landing systems for rockets.

Systems and methods are described herein for mitigating damage to landing rockets, which may be a launch vehicle, a rocket stage, a part of a larger launch system, or other vehicles as described herein. The subject matter relates to a deceleration pool for safely receiving the landing rocket. The deceleration pool is configured to prevent or limit damage to the rocket if the rocket does not successfully secure with a land-based primary landing system.

A system for receiving rockets upon landing comprising a deceleration pool is described. The system comprises a volume filled with a liquid, and one or more injection manifolds for injecting gas into the liquid to create a density profile throughout the deceleration pool. The resulting density profile may be a gradient density profile having a lowest density at the center of a landing region and higher density away from the center, such as increasing in density radially outward. The pool may be located under a hook system or other receiving structure intended to secure the landing rocket. The pool may be a contingency system for mitigating damage to the rocket that unsuccessfully attempts landing on the hook system.

In one aspect, the system comprises a deceleration pool containing water and an injection manifold attached to the pool such that the injection manifold receives pressurized gas from a storage tank. High-pressure tanks in conjunction with control valves inject gas in selective locations of the deceleration pool to lower the density of the water according to a desirable density profile. The resulting deceleration pool increases the deceleration time of the rocket and decreases the impact loads on the rocket. The deceleration pool also aids in extinguishing any fire that might result if the primary structure is compromised during recovery, thus allowing the re-use of the majority of the hardware.

In one aspect, a liquid deceleration system for receiving a landing rocket is described. The liquid deceleration system includes at least one storage tank, a deceleration pool, and at least one injection manifold. The at least one storage tank contains a gas. The deceleration pool includes a foundation and a sidewall extending upward from the foundation defining a volume. The deceleration pool is configured to contain a liquid within the volume defined by the foundation and sidewalls of the deceleration pool. The at least one injection manifold is in fluid communication with the at least one storage tank and configured to inject the gas into the liquid of the deceleration pool through a plurality of openings.

The above and other aspects have various embodiments. For example, in some embodiments, the liquid deceleration system further includes a landing hook system disposed above the deceleration pool and configured to catch a landing rocket. In some embodiments, the liquid deceleration system further includes one or more valves in fluid communication with the at least one storage tank and the at least one injection manifold. In some embodiments, the volume of the deceleration pool defines a lateral area greater than or equal to a square of a height of a landing rocket. In some embodiments, the liquid contained within the deceleration pool is water-based. For example, the water-based liquid can be untreated water, freshwater, seawater, brine, saturated brine, or treated water containing sodium hypochlorite, chlorine, or salt. In some embodiments, the gas is pressurized to a pressure exceeding the pressure of the liquid located at the bottom of the deceleration pool. In some embodiments, the gas is pressurized to 2.5 MPa. In some embodiments, the plurality of openings of the injection manifold are radially disposed about a landing region of the deceleration pool. In some embodiments, the liquid has a gradient density profile. For example, the liquid can have a first density at a landing region of the deceleration pool lower than a second density of the liquid adjacent to the sidewall.

In another aspect, a landing system for a rocket is described that includes a rocket catch and a backup liquid deceleration system. The rocket catch is configured to receive and support a landing rocket thereon. The backup liquid deceleration system is configured to receive the landing rocket if the rocket catch fails to support the landing rocket. The backup liquid deceleration system further includes a pool of liquid disposed underneath the rocket catch and a gas injection system. The pool is configured to receive the landing rocket. The gas injection system is in fluid communication with the pool and configured to inject a gas into the liquid.

The above and other aspects have various embodiments. For example, in some embodiments, the density of the liquid at a landing region of the pool is lower than the density of the liquid adjacent to a periphery of the pool. In some embodiments, the pressure of the gas exceeds the pressure of the liquid located at the bottom of the pool. In some embodiments, the pool includes a foundation and a sidewall extending upward from the foundation. The foundation and the sidewall define a volume. The volume of the pool contains the liquid. In some embodiments, the landing system further includes at least one injection manifold in fluid communication with the gas injection system. In some embodiments, the at least one injection manifold is configured to release the gas according to a gradient density profile, wherein the at least one injection manifold comprises a plurality of openings radially concentrated about a landing region of the pool.

In another aspect, a method for landing a rocket is described that includes identifying a rocket descending toward a primary landing system and injecting a gas into a pool of liquid. The primary landing system is configured to secure the rocket. The pool of liquid is located under the primary landing system and configured to receive the rocket into the pool of liquid in response to the primary landing system failing to secure the rocket.

The above and other aspects have various embodiments. For example, in some embodiments, the method further includes receiving the rocket into the pool of liquid. In some embodiments, the method further includes releasing the gas from a storage tank through an injection manifold. In some embodiments, the method further includes causing a density of the liquid in a landing region of the pool of liquid under the primary landing system to be less than a density of the liquid radially outward from the landing region.

BRIEF DESCRIPTION OF THE DRAWINGS

The foregoing and other figures of the disclosure will become more fully apparent from the following description and appended claims, taken in conjunction with the accompanying drawings.

DETAILED DESCRIPTION OF THE PREFERRED EMBODIMENT

In the following detailed description, reference is made to the accompanying drawings. In the drawings, similar symbols typically identify similar components, unless context dictates otherwise. Thus, in some embodiments, part numbers may be used for similar components in multiple figures, or part numbers may vary from figure to figure. Further, the illustrative embodiments described herein are not meant to be limiting. Other embodiments may be utilized, and other changes may be made, without departing from the spirit or scope of the disclosure presented. It will be readily understood that the aspects of the present disclosure described herein and illustrated in the figures can be arranged, substituted, combined, and designed in a wide variety of different configurations by a person of ordinary skill in the art, all of which are made part of this disclosure.

Reference in the specification to "one embodiment," "an embodiment", or "in some embodiments" means that a particular feature, structure, or characteristic described in connection with the embodiment is included in at least one embodiment of the disclosure. Moreover, the appearance of these or similar phrases throughout the specification does not necessarily mean that these phrases all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

Some rockets, such as reusable rockets that can be launched or otherwise used multiple times, return and land on earth after use. Some rockets use landing gear deployed at the base of the rocket to stabilize the rocket upright on a solid landing pad. These landing gear components accompany the rocket throughout an entire mission. A rocket can be operated with increased efficiency by removing landing gear from the rocket, thereby conserving mass. Eliminating the landing gear components can also simplify the design of any rocket while substantially increasing its payload capability.

Some rockets may utilize alternative landing approaches, such as grabbing a landing hook to provide landing capability without landing gear. Such landings can be risky and subject to external and internal forces. Landing rockets typically have limited propellent available to translate the rocket into position for a vertical touchdown on a landing pad or grasping a landing hook fixed to a tower. If the landing attempt is unsuccessful, the landing rocket may be damaged, resulting in a loss of an asset. A primary landing system in conjunction with a contingency recovery system could significantly reduce recovery risk.

A backup liquid deceleration system according to the present disclosure is described comprising a deceleration pool for receiving rockets upon landing. The deceleration pool may be a backup for rockets that fail to secure with a primary landing or securement system located over the deceleration pool. The deceleration pool comprises a volume filled with a liquid, and one or more injection manifolds for injecting gas into the liquid to create a desired density profile throughout the deceleration pool. The density profile corresponds to the density of the liquid throughout its volume. The desired density profile may be uniform or non-uniform. A uniform density profile is where the density of the liquid is identical or similar throughout its volume. A uniform density profile need not have a constant density over time so long as the changing density is uniform across the liquid. A non-uniform density profile may be called a gradient density profile where the density of the liquid located at a first location of its volume differs from the density of the liquid located at a second location of its volume.

A gradient density profile of the pool may be controlled such that the density of the liquid follows a desired pattern. For instance, the gradient density profile may have a lowest density at the center of the liquid's volume, such as in a landing region, and higher density at a location away from the center, such that the density increases radially away therefrom. The deceleration pool may be located under a catch system, or other receiving structure intended to secure the landing rocket. The deceleration pool may be a contingency system for mitigating damage to the rocket if the rocket unsuccessfully attempts landing on the catch system. The system may be implemented with any primary landing system in addition to the pool. In some embodiments, the deceleration pool may be used as a contingency recovery system for mitigating damage to the rocket if the rocket unsuccessfully attempts landing on a hook catching system.

Figure 1:
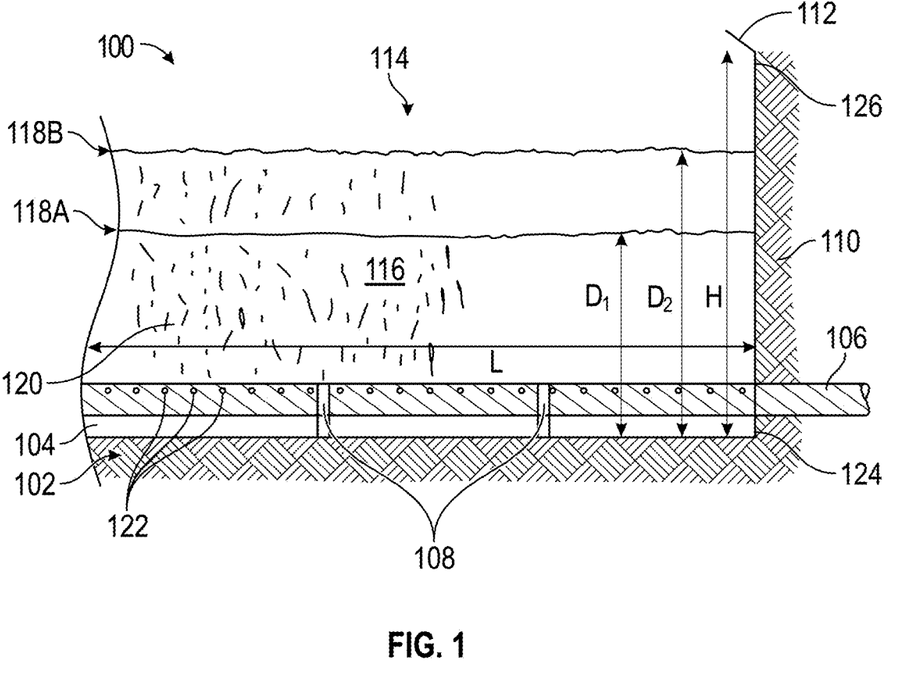
FIG. 1 is a partial side cross-sectional view of an embodiment of a deceleration pool for receiving a landing rocket that may be used with a primary landing system.

FIG. 1 is a partial side cross-sectional view of an exemplary embodiment of a deceleration pool 100 of a backup liquid deceleration system for mitigating damage to descending rockets. The deceleration pool 100 may comprise a foundation 102, a base layer 104, one or more injection manifolds 106, a plurality of anchors 108, a sidewall 110, and/or one or more splash plates 112. The sidewall 110 may form an outer periphery of the deceleration pool 100 defining a volume 114 open at the top and containing a liquid 116 shown having different surface levels 118A, 118B based on different operations of the system.

The foundation 102 may be level and provide a support for the deceleration pool 100. The foundation 102 may be formed from any suitable materials to support the weight of the deceleration pool 100 including a rocket, the construction materials of the base layer 104, the injection manifold 106, the plurality of anchors 108, the sidewall 110, and the weight of the cubic volume of the liquid 116. In some embodiments, the foundation 102 may be formed of a non-porous material to prevent the liquid 116 from escaping the deceleration pool 100 if the base layer 104 is damaged. In other embodiments, the foundation 102 may be formed of a porous material for controllably draining the deceleration pool 100 when the base layer 104 is damaged or if a floodgate or hatch is opened.

The liquid 116 may have a lateral area configured to receive the falling rocket. The lateral area may be a planar region perpendicular to the height H. A lateral dimension L may define a width and/or a length of the volume 114 of the liquid 116 to thereby define the lateral area. The lateral dimension L may be perpendicular to a vertical axis and may extend along a horizontal plane. The vertical axis may extend upwardly from the foundation 102 and/or base layer 104 and may be parallel with a vertical dimension such as a height H, or a depth $D_1$, $D_2$. In some embodiments, there may be one or more lateral dimensions L that may each extend between one or more sidewalls 110. For example, if the lateral area is a circular cross-section/area, then the lateral dimension L may be either a length or width, i.e., the diameter. If the lateral area is a rectangle, then there are two lateral dimensions L, namely the length and the width. The foundation 102 may also define a lateral area that extends beyond a lateral area of the volume 114 defined by the sidewall 110. Furthermore, the lateral area of the foundation 102 may be greater than or equal to the height of a rocket such that the rocket may lay within the volume 114 of liquid 116 in any horizontal orientation. More specifically, the volume 114 of liquid 116 may define a lateral area up to three times greater than the height of the rocket. The foundation 102 may be located within a cavity in the earth formed from excavation. In some embodiments, the foundation 102 may be treated earth, such as compacted soil. In other embodiment, the foundation 102 may be poured cement, concrete, or other suitable materials.

The base layer 104 may be a non-corrosive coating covering the foundation 102 providing a barrier between the liquid 116 and the foundation 102. In some embodiments, the base layer 104 may be, or comprise in part, one or more non-porous materials such as polyurethane, rubber, rubberized asphalt, thermoplastics, or a cementitious coating. The base layer 104 may further comprise materials of sufficient strength to withstand forces up to five million pounds.

The injection manifolds 106 may comprise one or more walls defining a cavity having an interior volume, such as a tube or pipe, in fluid communication with one or more storage tanks (e.g., tanks 218 in FIGS. 2A and 2B) containing a gas 120. In some embodiments, the one or more storage tanks may be configured as part of a larger gas injection system. The injection manifold 106 may further comprise a plurality of openings 122, only a few of which are labeled in the figure for clarity. The openings 122 may be passages located along the length of the injection manifold 106 for releasing the gas 120 into the liquid 116. In some embodiments, the one or more storage tanks may be located exterior to the volume 114 where at least a segment of the injection manifold 106 may extend through an opening in the sidewall 110 and couple to the one or more storage tanks.

Segments of the injection manifold 106 may couple with one another, forming a network of interior passageways in fluid communication with the gas 120. In some embodiments, the injection manifold 106 may be configured in a predetermined pattern extending across the surface of the base layer 104 or foundation 102 for creating a desired density profile throughout the liquid 116.

The openings 122 may be located anywhere along the length of the injection manifold 106. The gas 120 may be emitted from the openings 122 into the liquid 116 for aerating the deceleration pool 100 by introducing the gas 120 into the liquid 116. In some embodiments, the openings 122 may be located along a top side of the injection manifold 106. Furthermore, in some embodiments, the openings 122 may be equally spaced along the injection manifold 106 for uniformly introducing the gas 120 into the liquid 116 according to a uniform density profile such that the density of the liquid 116 is uniform throughout the volume 114. In other embodiments, a concentration of the openings 122 may be focused about a particular region, such as the center, of the volume 114. A first concentration of the openings 122 may be located about the central portions of the injection manifold 106 and a second concentration less than the first concentration may be located radially outwardly therefrom, such as at the radially outer fringes of the injection manifold 106. A gradient of densities caused by the gas 120 may thus be created across the volume 114.

The center of the volume 114 may be the middle point of a horizontal plane of the deceleration pool positioned perpendicular to a vertical axis extending from the foundation 102 to the atmosphere. The center of the volume 114 may have a lower density than the laterally more exterior locations of the volume 114. For example, in a cylindrical deceleration pool 100 having a first radius extending from a central axis to the sidewall 110, the center of the volume may be a cylindrical region concentric with the deceleration pool having a second radius smaller than the first radius extending laterally from the central axis of the cylinder. In some embodiments, the "center" as described herein may refer to the center of a landing region within the deceleration pool 100, where the landing region is where the rocket would be expected to fall into, even if the location of the landing region is not the geometric center of the volume 114 with respect to the sidewalls 110.

The openings 122 and/or injection manifold 106 may include one-way valves to prevent the liquid 116 from entering the injection manifold 106 through the openings 122 from the volume 114 while allowing the gas 120 to pass from the one or more storage tanks to the volume 114 through the openings 122. Additionally and/or alternatively, the pressure of the gas 120 contained within the one or more storage tanks and the injection manifold 106 may be greater than or equal to the pressure exerted by the liquid 116 at the bottom of the volume 114 adjacent to the injection manifold 106, to thereby prevent liquid 116 from entering the injection manifold 106 via the openings 122. In some embodiments, the injection manifold 106 may be configured to withstand up to 1, 2, 3, 4, or 5 mega Pascals (MPa) or more of pressure.

The plurality of anchors 108 support and secure the injection manifold 106 to the foundation 102 and base layer 104. In some embodiments, the plurality of anchors 108 may surround the injection manifold 106, penetrate the base layer 104, and penetrate the foundation 102. The plurality of anchors 108 may be metallic brackets, tie rods, or supports. Furthermore, the plurality of anchors 108 may be formed of non-corrosive materials such as stainless-steel alloys and aluminum for maintaining its integrity within the liquid 116.

The sidewall 110 may extend upwards from the foundation 102 at a first lower end 124 of the sidewall 110 to a second upper end 126 opposite the first lower end 124. As mentioned above, the sidewall 110 may form an outer periphery of the deceleration pool 100 defining a volume 114 open at the top. The sidewall 110 may be formed by any combination of one or more wall segments extending upward from the foundation 102, such as four wall segments. In some embodiments, the sidewall 110 may share the same materials, characteristics, and qualities as the foundation 102. In some embodiments, the deceleration pool 100 may be excavated from the earth such that the foundation 102 and sidewall 110 are made of earth. Alternatively, in some embodiments, the deceleration pool 100 may be located above the surface of the earth such that the foundation 102 and sidewall 110 may be made of concrete or other reinforced material. In some embodiments, the sidewall 110 may be formed of a different material than the foundation 102.

In some embodiments, the sidewall 110 may be formed by a single wall segment. The single wall segment may be rounded such that the sidewall 110 forms a perimeter in the shape of an ellipse, circle, or oval. In some embodiments, the sidewall 110 may be formed by a plurality of wall segments. The plurality of wall segments may be linear such that the sidewall 110 forms a perimeter in the shape of a polygon such as a triangle, a rectangle, a pentagon, a hexagon, or an octagon. In some embodiments, the sidewall 110 may be formed by a combination of rounded and linear wall segments. From another perspective, a cross-section of the deceleration pool 100 taken perpendicular to the vertical axis may define a square, rectangle, ellipse, circle, oval, polygon, or combination of the foregoing.

In some embodiments, the sidewall 110 may extend vertically from the foundation 102 at a right angle, as shown in FIG. 1. In other embodiments, the sidewall 110 may extend upwards from the foundation 102 at an oblique angle. Furthermore, the sidewall 110 may have nonlinear walls. For example, the sidewall 110 may have a parabolic shape, may bow near the center, or may slope upwards from the foundation 102. In such embodiments, the volume 114 may have a non-constant horizontal cross-sectional area along a vertical length of the sidewall 110.

The structure of the deceleration pool 100 and volume 114 may be sized and configured to receive a rocket within the liquid 116 of the deceleration pool 100. For example, the sidewall 110 may have a height H greater than or equal to the height of the rocket. In some embodiments, the sidewall 110 may have a height H exceeding three times the height of a rocket. Similarly, a minimum of the lateral dimension L of the sidewall 110 may be greater than or equal to the height of the rocket. If there are multiple lateral dimensions, such minimum may be the smallest among the multiple lateral dimensions L. The lateral dimension L may be a distance between two opposing sidewalls 110 of the deceleration pool 100. In some embodiments, the lateral dimension L of the sidewall 110 may be greater than or equal to two or three times the height of the rocket. Sizing the sidewall 110 to have vertical and horizontal dimensions exceeding the height of the rocket advantageously provides the volume 114 sized to receive the rocket in any three-dimensional orientation. The sidewall may have a height H of 200 feet or more, 400 feet or more, 600 feet or more, or 800 feet or more. For example, the sidewall 110 may have a height H of 1000-feet. The sidewall 110 may have a lateral dimension L, e.g., a diameter (where the lateral area defines a circle), of 1000 feet or more. The rocket may be about 330 feet tall. The sidewall 110 may comprise four 650-foot-tall walls forming a square. The one or more walls or segments thereof may have lengths in a direction perpendicular to the vertical axis. The walls may have wall lengths of at least 650 feet when used with an at least 216-foot-tall rocket. In some embodiments, the lateral dimension L of the sidewall 110 may not be the same as the height H of the sidewall 110. The depth $D_1$, $D_2$ of the liquid 116 may be any of the aforementioned heights. In some embodiments, the depth $D_1$, $D_2$ of the liquid 116 may be less than the height H of the sidewall 110. In some embodiments, the depth $D_1$ may be different from the depth $D_2$.

The one or more splash plates 112 may be positioned on the sidewall 110 for directing displaced liquid back into the deceleration pool 100. In some embodiments, the one or more splash plates 112 extend inwardly from the second upper end 126 of the sidewall 110 located on the top of the sidewall 110. In some embodiments, the one or more splash plates 112 may be oriented inward toward the center of the volume 114 at an angle between the sidewall 110 and the surface level 118A, 118B of the liquid 116.

The volume 114 is defined by the foundation 102 and/or the base layer 104 on a bottom side and the sidewall 110 on all lateral sides of the foundation 102. The volume 114 can be any three-dimensional shape with an open top as discussed above and is configured to receive a liquid 116. The volume 114 may be sized to receive the rocket. In some embodiments, the volume 114 may define dimensions that each exceed the height of the rocket, such as those dimensions described above. Further, a lateral area of the volume 114, defined by the lateral length and lateral width of the volume 114, may be greater than or equal to the square of the height of the rocket, such that the rocket may lay along the foundation 102 in any orientation. Moreover, in some embodiments, the lateral area of the volume 114 may be greater than or equal to the square of three times the height of the rocket for providing sufficient room for the rocket to land within the volume 114. Furthermore, the volume 114 may be sized to contain the liquid 116 and the rocket when the rocket lands in the deceleration pool 100 thereby displacing the liquid 116.

The liquid 116 may be any Newtonian liquid capable of minimizing the impact of the descending rocket. In some embodiments, the liquid 116 may be a water-based liquid such as untreated water, freshwater, seawater, brine, saturated brine, or treated water comprising sanitizing or disinfecting chemicals such as sodium hypochlorite, chlorine, or salt. In some embodiments, the liquid 116 may be regulated to control the potential of hydrogen ("pH") of the pool for mitigating undesirable exposure of the rocket hardware to any potential corrosion.

FIG. 1 further illustrates the deceleration pool 100 with the liquid 116 having two surface levels 118A, 118B at different points in time. The liquid 116 may have a first surface level 118A when the injection manifold 106 is inactive and/or prior to receiving the rocket in the liquid 116. The first surface level 118A may correspond to a first depth $D_1$ spanning between the first surface level 118A and the foundation 102 and/or base layer 104. The liquid 116 may have the second surface level 118B that is higher than the first surface level 118A when the injection manifold 106 is active and aerating the liquid 116 with a gas 120 and/or after receiving the rocket in the liquid 116. The second surface level 118B may correspond to a second depth $D_2$ spanning between the second surface level 118B and the foundation 102 and/or the base layer 104. In such embodiments, the second surface level 118B, corresponding to active injection of the gas 120, is higher than the first surface level 118A, corresponding to none or decreased injection of the gas 120, due to the difference in density between the otherwise identical liquid 116. Accordingly, the second depth $D_2$ may be greater than the first depth $D_1$.

In some embodiments, the density of the liquid 116 may be within a first range from about 55 to 65 pounds per cubic foot (lb/cu ft), about 60 lb/cu ft, or about 62.4 lb/cu ft, under non-operating conditions (i.e., when the injection manifold 106 is inactive). The density of the liquid 116 may drop to within a second range from about 40 to 50 lb/cu ft, or to about 45 lb/cu ft, under operating conditions (i.e., when the injection manifold 106 is active). Accordingly, the density of the liquid 116 may be affected by the operation of the injection manifold 106. Furthermore, the depth of the liquid 116 may change due to injection of the gas 120. When the gas 120 is not being injected, the liquid 116 may have the first surface level 118A. When the gas 120 is being injected, the liquid 116 may have the second surface level 118B that is higher than the first level 118A.

Additionally, in some embodiments where the deceleration pool 100 is subjected to a gradient density profile, the second surface level 118B along the lateral area of the liquid 116 may be non-uniform, such that the height of the second surface level 118B fluctuates according to the density profile of the liquid 116. For example, under a gradient density profile having a lowest density at a first region of the deceleration pool 100, such as radially inwardly away from the sidewalls 110, and the highest density at a second region, such as adjacent to the sidewalls 110, the surface level 118B may be relatively higher at the first region and relatively lower at the second region as compared to the first region.

The gas 120 can be any gas or mixture of gases including carbon, nitrogen, oxygen, or any combination thereof. The gas 120 may be contained in storage tanks. In some embodiments, the gas 120 may be compressed within the storage tanks. In some embodiments, the gas 120 may be compressed to a pressure exceeding the pressure at the bottom of the deceleration pool 100 adjacent to the injection manifold 106. For example, in some embodiments the gas 120 may be pressurized to 1, 2, 3, 4, or 5 MPa. The gas 120 may be pressurized to pressures between the aforementioned values. For example, the gas 120 may be pressurized to 2.5 MPa.

Figure 2A:
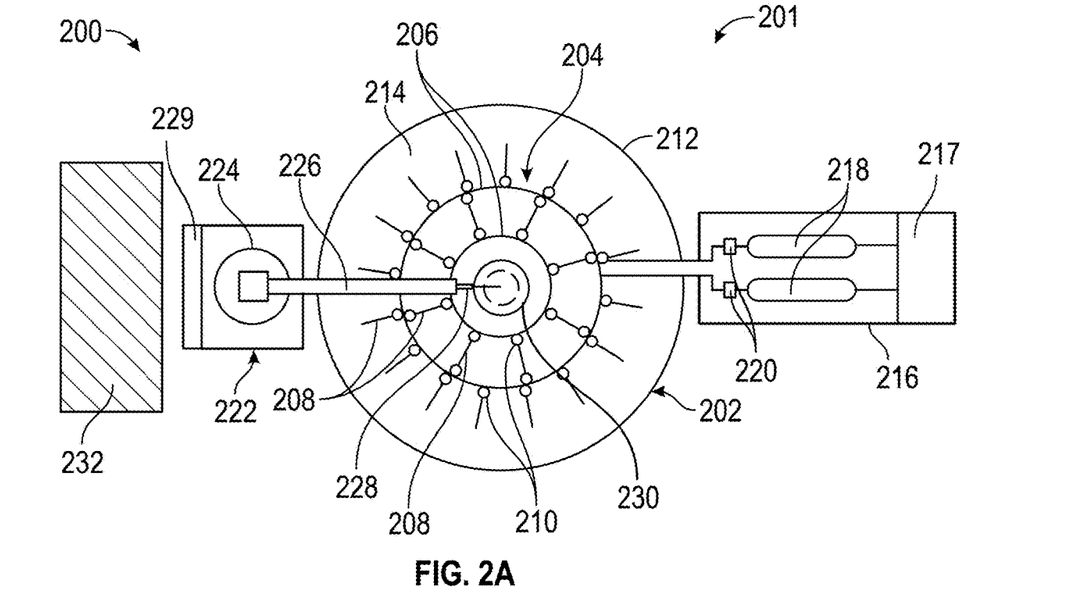
FIG. 2A is a top view of an embodiment of a rocket landing system having a rocket catch and a deceleration pool.
Figure 2B:
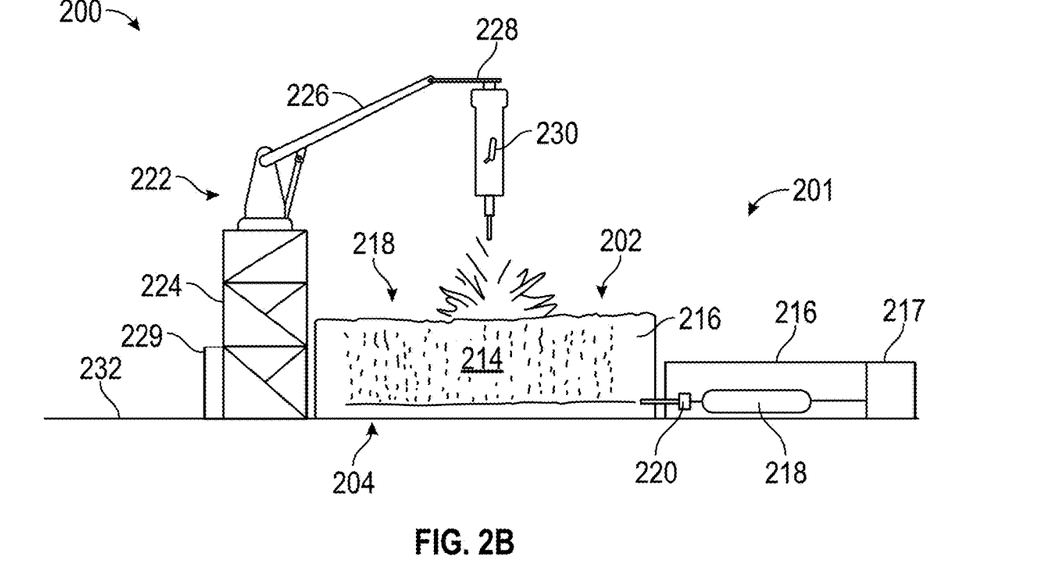
FIG. 2B is a side view of the rocket landing system of FIG. 2A.

FIGS. 2A-2B illustrate top and side views respectively of a rocket landing system 200 comprising a backup liquid deceleration system 201 and a primary landing system 222. The backup liquid deceleration system 201 may comprise a deceleration pool 202 further comprising one or more injection manifolds 204, one or more sidewalls 212, a liquid 214, a housing 216, and a control system 217. The one or more injection manifolds 204 may further comprise one or more primary manifolds 206, one or more secondary manifolds 208, and one or more valves 210. The housing 216 may further comprise one or more storage tanks 218 and one or more inlet valves 220. The primary landing system 222 may comprise a hook tower 224, a hook beam 226, a hook 228, and/or an offload pad 232. The primary landing system 222 may further comprise a control system 229.

The deceleration pool 202 may be positioned adjacent to and/or below the primary landing system 222. For example, the deceleration pool 202 may be positioned adjacent to the hook tower 224 and below a hook beam 226, as shown in FIGS. 2A-2B. In some embodiments, a vertical distance between the deceleration pool 202 and the primary landing system 222 may exceed the height of a rocket 230. The offload pad 232 may be positioned at a location adjacent to and/or below the primary landing system 222. In some embodiments, the housing 216 may be located within the deceleration pool 202. In other embodiments, the housing 216 may be located remotely from the deceleration pool 202.

The deceleration pool 202 may include the same or similar features as the deceleration pool 100 discussed in FIG. 1, and vice versa. As shown in FIGS. 2A and 2B, the deceleration pool 202 may include the injection manifold 204, the sidewall 212, and the liquid 214, which may have the same or similar features as, respectively, the injection manifold 106, the sidewall 110, and the liquid 116 as described with respect to FIG. 1, and vice versa. One or more adjustable inlet valves 220 may be located along the piping leading from the storage tanks 218 to the injection manifold 204. The inlet valve 220 may be opened for providing the gas from the one or more storage tanks 218 to the injection manifold 204. The gas may be pressurized such that the gas passively injects into the liquid 214 due to the pressure difference. In some embodiments, the system may include one or more pumps configured to actively convey the gas into the liquid 214.

As shown in FIG. 2A, the injection manifold 204 may further comprise one or more primary manifolds 206 and/or one or more secondary manifolds 208 (in FIG. 2A, for clarity, only some of each of the manifolds 206, 208 are labeled). The one or more primary manifolds 206 and/or one or more secondary manifolds 208 may form a piped labyrinth in fluid communication with the gas released from the storage tanks 218. In some embodiments, the one or more primary manifolds 206 may be configured as a plurality of rings concentric with a center of an expected landing region of the rocket 230, which may be a center of the volume defined by the sidewall 212. One or more secondary manifolds 208 may extend radially outwardly from the one or more primary manifolds 206. For example, one or more secondary manifolds 208 may extend radially outwardly from a first primary manifold 206 configured as an inner ring to a second primary manifold 206 configured as an outer ring. The one or more secondary manifolds 208 may interconnect the interior passages of the one or more primary manifolds 206. In some embodiments, the injection manifold 204 may be configured in a pattern wherein the one or more primary manifolds 206 are arranged in a series of parallel linear segments connected to respective adjacent linear segments via one or more secondary manifolds 208. The one or more primary manifolds 206 and the one or more secondary manifolds 208 may each comprise the openings 122, as described with respect to FIG. 1.

The one or more primary manifolds 206 may share a universal flow direction when the one or more secondary manifolds 208 are located along the same ends, e.g., the radially inward ends, of the one or more primary manifolds 206. Alternatively, the one or more primary manifolds 206 may have alternating flow directions when the one or more secondary manifolds 208 attach to alternating ends of the one or more primary manifolds 206.

In some embodiments, the centrally located portions of the injection manifold 204 may comprise more openings 122 than the radially outwardly located portions of the injection manifold 204. For example, an interior portion of the injection manifold 204, such as a first primary manifold 206 located at an interior position, may have more openings 122 than an exterior portion of the injection manifold 204, such as a second primary manifold 206 located at a more radially outward position, as shown in FIG. 2A.

Furthermore, the injection manifold 204 may provide a counterflow of gas where the gas may flow through the injection manifold 204 in opposing directions. In some embodiments, the injection manifold 204 may comprise two or more interior pipes within a cavity defined by the injection manifold 204. The interior pipes may be parallel with one another each having an inlet end and an outlet end. Additionally, the interior pipes may extend along the length of the injection manifold 204. In some embodiments, a first interior pipe may have a first flow direction and a second interior pipe may have a second flow direction opposite the first flow direction. In some embodiments, the interior pipes may be coupled to one another at one or more ends of the interior pipes. In such embodiments, the outlet of a first interior pipe may be the inlet of a second interior pipe. The gas may enter a first interior pipe, flow through the length of the first interior pipe, exit the first interior pipe, enter the second interior pipe, and flow through the length of the second interior pipe. In some embodiments, the interior pipes may mutually be in fluid communication with the openings 122. The counterflow pattern may advantageously make up for pressure loss within the injection manifold 204.

The injection manifold 204 may further comprise a plurality of valves 210 (in FIG. 2A, for clarity, only a few of the valves 210 are labeled). The valves 210 may be configured for tuning the density distribution of the deceleration pool 202 by controlling the release of the gas 120. In some embodiments, the valves 210 may be spaced within the injection manifold 204. The valves 210 may create a plurality of chambers within the injection manifold 204 having varying degrees of pressure. For example, one or more valves 210 may be positioned within each of the secondary manifolds 208. In some embodiments, the valves 210 may be located within the secondary manifolds 208 at positions adjacent to a junction between a primary manifold 206 and a corresponding secondary manifold 208, as shown in FIG. 2A. Accordingly, each primary and secondary manifold 206, 208 may be separated or closed off from the other manifolds 206, 208 thereby creating individual chambers.

In some embodiments, one or more valves 210 may be positioned within the primary manifolds 206 to provide distinct chambers within each of the primary manifolds 206. Similarly, one or more valves 210 may be positioned intermittently along the secondary manifolds 208 to provide additional chambers within each of the secondary manifolds 208. Providing additional chambers may advantageously allow for greater control on the pressure distribution through the injection manifold 204.

In some embodiments, the valves 210 may be incorporated with the openings 122 such that each opening 122 may be selectively opened or closed. In some embodiments, the valves 210 may be binary such that the valves 210 are either opened or closed. In some embodiments, the valves 210 may be non-binary such that the valves 210 have a range of openness and can selectively pass gas through the valves 210 at varying rates.

The injection manifold 204 may create a gradient density profile across the liquid 214 where the lowest density of the liquid 214 is centrally located in a landing region of the deceleration pool 202. The density may increase radially outward away from the center of the landing region of the deceleration pool 202 to the periphery of the deceleration pool 202. Such landing region may be located at or near the center of the pool. Such arrangements may advantageously bias the rocket 230 toward a desired location, such as the center of the landing region and/or center of the pool, due to increased buoyant forces surrounding such location. Alternatively, the injection manifold 204 may create a uniform density profile across the liquid 214 thereby advantageously providing a uniform body for the rocket 230 to enter any point of the deceleration pool 202. In such embodiments, the density gradient may then be altered after receiving the rocket 230 to bias the vehicle as described to a particular location and/or prevent collision with the sidewalls.

The housing 216 may be a protective container configured to house storage tanks 218. The housing 216 may comprise one or more access holes for access lines of the injection manifold 204 to access the one or more storage tanks 218. The housing 216 may be above ground or may be buried. In some embodiments, the housing 216 may be a utility building or shed. In some embodiments, the housing 216 may be secure to prevent unauthorized access. The housing 216 may be formed of concrete. The housing 216 may be reinforced. In some embodiments the housing 216 may further comprise a secure room configured to store one or more computers such as a control room or server room. The secure room may be secured to provide access to authorized individuals.

The rocket landing system 200 may include the control system 217. The control system 217 may comprise a processor and memory having instructions stored thereon for execution by the processor. The control system 217 may be configured to control the operation of the backup liquid deceleration system 201 and/or other features of the rocket landing system 200. In some embodiments, the control system 217 may be located within the housing 216. For example, the control system 217 may be located within a secure room within the housing such as a control room or server room. The control system 217 may operate the backup liquid deceleration system 201 in response to user commands and/or to receiving data related to an upcoming landing of the rocket. The control system 217 may be electrically connected with the one or more valves 210 and one or more inlet valves 220 to control the release of gas into the deceleration pool 202 to create the density changes described herein. The control system 217 or a pump may cause the gas to flow from the one or more storage tanks 218 through the one or more injection manifolds 106. The control system 217 may control the gas injection based on various parameters, such as a pressure of the gas in the injection manifold 204, a density of the liquid 214, a depth of the liquid 214, the gradient profile of the liquid 214, the successful or unsuccessful securing of the rocket with the primary landing system 222, and/or a location, speed, orientation or other parameter related to the descending rocket.

The one or more storage tanks 218 may be configured to contain a volume of the gas. Accordingly, the one or more storage tanks 218 may be airtight with seals. Furthermore, the one or more storage tanks 218 may be configured to withstand high pressures to accommodate a pressurized gas. Additionally, the one or more storage tanks 218 may be cylindrically shaped. The one or more storage tanks 218 may be sized to store large quantities of gas. In some embodiments, the one or more storage tanks 218 may be configured to store more than 60 thousand gallons of gas. In some embodiments, the one or more storage tanks may be configured to store up to 48 million gallons of gas. The one or more storage tanks 218 may further comprise a pump for pressurizing the one or more storage tanks 218. In some embodiments the one or more storage tanks 218 may be high-pressure storage tanks configured to withstand at least 1, 2, 3, 4, or 5 MPa.

The one or more inlet valves 220 may be airtight and configured to control the release of gas from the one or more storage tanks 218 to the injection manifold 204. The one or more inlet valves 220 may be configured to withstand at least 1, 2, 3, 4, or 5 MPa.

In some embodiments, the one or more storage tanks 218 and the one or more inlet valves 220 may be part of a gas injection system configured to provide gas to the deceleration pool 202. In some embodiments, the gas injection system may comprise two or more storage tanks 218 in fluid communication with one another and with one or more inlet valves. The gas injection system may be configured to controllably release gas into the deceleration pool 202. In some embodiments, the control system 217 may be part of the gas injection system and configured to directly control the release of gas into the deceleration pool 202. In some embodiments, the control system 217 is separate from the gas injection system. The gas injection system may be in electrical communication with other systems and configured to engage the one or more valves 204 and/or the inlet valves 220 in response to said electrical communications.

The primary landing system 222 may be any rocket landing system. In some embodiments, a hook landing system, rocket catch, or other landing system, or features thereof, may be used for the primary landing system 222. The primary landing system 222 may include a hook tower 224, a hook beam 226, and/or a hook 228. The hook tower 224 may provide a structural support to the landing system configured to support the mass of the rocket 230. A hook beam 226 may extend at least partially laterally from the hook tower 224 culminating in a hook 228 configured to engage with the rocket 230.

In some embodiments, the hook tower 224 may be configured to swivel about a central axis for rotating 360 degrees. In some embodiments, the hook beam 226 may be configured to raise and lower between a landing position and a retrieval position wherein the landing position is an elevated position above the deceleration pool 202 for engaging with the rocket 230 during a landing sequence. The retrieval position may be within the deceleration pool 202 for engaging with the rocket 230 in the deceleration pool 202 after a failed landing sequence with the primary landing system 222.

The hook tower 224 may retrieve the rocket, either directly from a landing or from the pool, and position the vehicle onto the offload pad 232. The hook 228 may engage the vehicle at one or more fittings or brackets of the vehicle. The hook beam 226 may then raise the vehicle out of the pool. The hook beam 226 may then rotate via one or more actuators to position the vehicle over the offload pad 232. The hook tower 224 may then lower the hook beam 226 to locate the vehicle on the offload pad 232, or onto a transportation vehicle on the pad. The hook 228 may then release the rocket 230, and in some embodiments thereafter rotate away from the offload pad 232.

In some embodiments, the hook tower may comprise a secure room configured to store one or more computers such as a control room or server room. The room may be secured to provide access to authorized individuals. The room may store the control system 229.

The control system 229 may comprise a processor and memory having instructions stored thereon for execution by the processor. The control system 229 may be configured to control the operation of the primary landing system 222. In some embodiments, the control system 229 may be located within the hook tower 224. For example, the control system 229 may be located within a secure room within the hook tower 224 such as a control room or server room. In other embodiments, the control system 229 may be located along or within the mechanical elements of the primary landing system 222. The control system 229 may operate the primary landing system 222 in response to user commands and/or to receiving data related to an upcoming landing of the rocket 230. The control system 229 may be electrically connected with actuators for controlling the motion of the hook beam 226 as described herein. Additionally, the control system 229 may be configured to detect a successful interaction with the rocket 230.

The control system 229 may communicate with the control system 217 to cooperatively control the rocket landing system 222 and the backup liquid deceleration system 201. In some embodiments, the rocket landing system 222 may only include the control system 229 or the control system 217. For example, either the control system 229 or the control system 217 may control both the primary landing system 222 and the backup liquid deceleration system 201.

The offload pad 232 may be located adjacent to the primary landing system 222 and configured to receive the rocket 230 after the conclusion of the landing sequence. In some embodiments, the offload pad 232 is a concrete pad. A vehicle may receive the rocket 230 at the offload pad 232. In some embodiments, a landing hook system may act as a crane and transition the rocket 230 from a landing or a retrieval position to a resting position wherein the landing position may correspond to a position where the rocket 230 successfully completes a launch sequence. The retrieval position may be where the rocket 230 is retrieved by the landing hook system after a failed landing sequence. The resting position may be on the offload pad 232 or a transportation vehicle thereon, as described.

In some embodiments, various landing systems, or features thereof, may be used for the primary landing system 222, such as those described in U.S. Pat. No. 10,822,122 issued Nov. 3, 2020 entitled "VERTICAL LANDING SYSTEMS FOR SPACE VEHICLES AND ASSOCIATED METHODS," in U.S. patent application Ser. No. 17/660,809 filed Apr. 26, 2022 entitled "SYSTEMS AND METHODS FOR RECEIVING A DESCENDING ROCKET," and in U.S. patent application Ser. No. 17/557,956 filed Dec. 21, 2021 entitled "SYSTEMS AND METHODS FOR SECUR- ING AN UPRIGHT ROCKET," the entire contents of each of which is incorporated by reference herein in its entirety and forms a part of this specification for all purposes.

In some embodiments, the primary landing system 222 may be a landing pad. The landing pad may be positioned above the pool. The landing pad may be used with rockets that have grid fins or parachutes, landing gear, and/or a landing propulsion system.

The rocket 230 may be any rocket configured to land, such as a reusable rocket. The rocket 230 may be a launch vehicle, a booster, a first stage rocket, a second stage rocket, a spacecraft, a spaceplane, an orbital vehicle, a sub-orbital vehicle, part of a larger launch system, and the like. In some embodiments, the rocket 230 may be configured for interacting with the primary landing system 222. For example, the rocket 230 may be a New Glenn® or New Shepard® rocket. The rocket 230 may comprise a control system configured for controlling reentry and landing of the rocket 230.

In embodiments where the control systems 217, 229 operate in communication with one another, the control system 229 may communicate a failed landing sequence to the control system 217. In response to the communication from the control system 229, the control system 217 may activate the injection manifold 204 by opening the one or more valves 210 and/or one or more inlet valves 220. Additionally and/or alternatively, the control system 217 may communicate a successful splashdown and that the rocket 230 is in a position for recovery. In response to the communication, the control system 229 may lower the hook 228 to recover the rocket 230 and move the rocket to the offload pad 232. In some embodiments, the control system of the rocket 230 may communicate with the control systems 217, 229. For example, the control system of the rocket 230 may inform the control systems 217, 229 of an imminent approach of the rocket 230. In response to the communication from the control system of the rocket 230, the control system 217 may activate the injection manifold 204 while the control system 229 may prepare the primary landing system 222 to engage with the rocket 230.

In other embodiments, a single control system may control two or more of control systems 217, 229 and the control system of the rocket 230. For example, a master control system may coordinate the functions and operations of the backup liquid deceleration system 201, the primary landing system 222, and the rocket 230. The various control systems described herein may be manually controlled by one or more human operators, automatically controlled with software stored in memory and executed by one or more processors, or combinations thereof.

Figure 3:
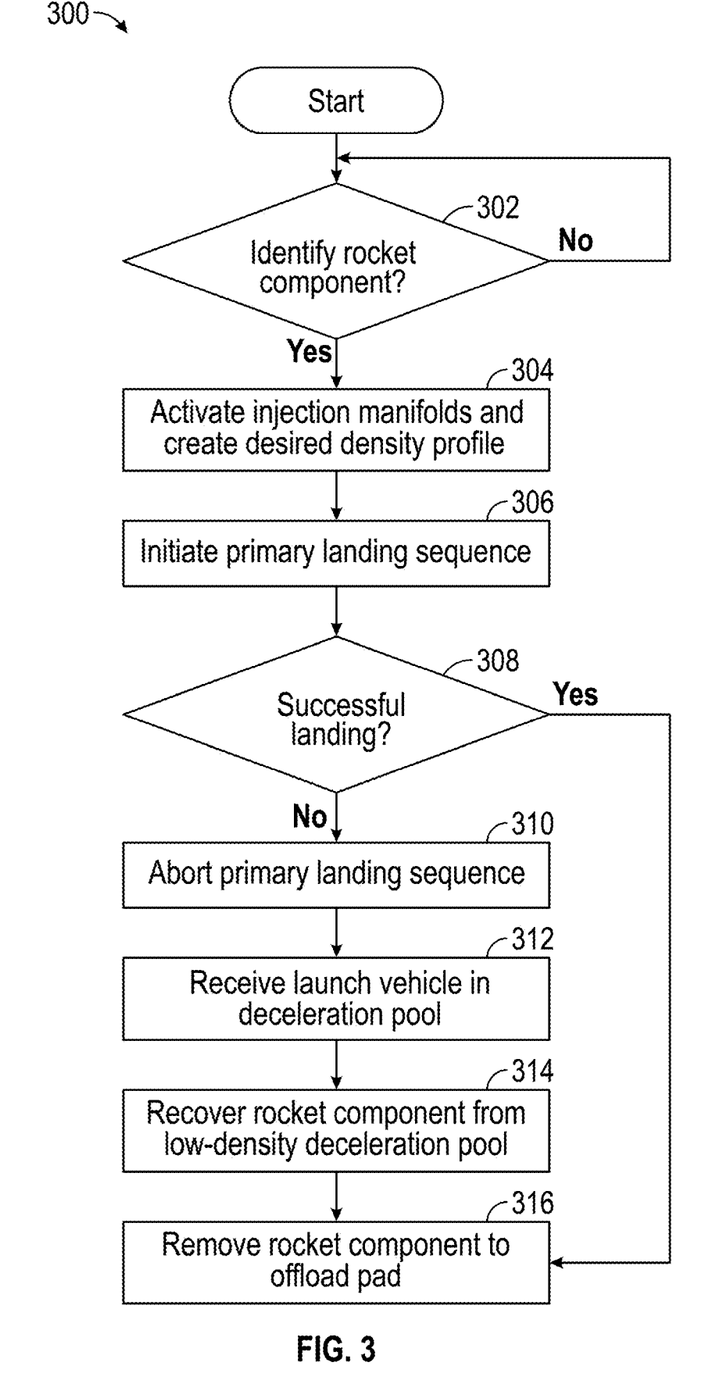
FIG. 3 is a flow chart showing an embodiment of a method for receiving a landing rocket using a landing system having a deceleration pool.

FIG. 3 is a flow chart illustrating an embodiment of a method 300 for landing a rocket using a backup liquid deceleration system having a deceleration pool. The method 300 may implement the deceleration pool discussed above with a primary landing system. The method 300 may be controlled and operated by one or more control systems. For example, a landing site with a backup liquid deceleration system may comprise a control system for each system, as discussed above. Alternatively, a single control system may be configured to control and coordinate functions between the primary landing system 222, the backup liquid deceleration system, and incoming rocket.

The method 300 begins with step 302 where an incoming rocket is identified. The vehicle may be approaching or descending from an interstellar, an orbital, or an atmospheric flight. The rocket may be identified via radar; light detection and ranging/light imaging, detection, and ranging ("LiDAR"); optical scanners; transponders configured to transmit an aircraft identification, global positioning system ("GPS") position, and altitude, such as an ADS-B transponder; and/or visual/audible confirmation. In some embodiments, the rocket may be considered an incoming or approaching rocket if the endpoint of the rocket's trajectory is within a predetermined proximity to a landing site comprising the primary landing system and the deceleration pool discussed herein.

The method 300 then moves to step 304 in which the deceleration pool is activated in response to an affirmative identification of an approaching rocket. A gas may be released into the liquid. The gas may be released according to a desired density profile of the liquid. In some embodiments, one or more inlet valves functionally located between one or more storage tanks and one or more injection manifolds may be opened thereby providing the gas to the deceleration pool. In some embodiments, additional regulation valves may be located within the one or more injection manifolds to control the release of the gas into the liquid according to a desired release pattern and/or corresponding density profile. In some embodiments, the deceleration pool may not be activated until a failure indicator is identified, as discussed in further detail below.

The method 300 then moves to step 306 in which a primary landing sequence is initiated between the rocket and the primary landing system. The landing sequence may include one or more of the following steps: activating a first propulsion system of the rocket, wherein the first propulsion system is configured to provide vertical thrust to the rocket thereby decelerating the rocket; and activating one or more secondary propulsion systems of the rocket, wherein the secondary propulsion systems are configured to provide lateral thrust to the rocket thereby orienting the rocket to a landing orientation.

The method 300 then moves to step 308 in which a successful landing sequence between the rocket and the primary landing system is identified. In some embodiments, the landing sequence may be identified as a success when the landing sequence is concluded after the rocket affirmatively engages with the primary landing system and comes to a complete stop. In the event the landing is successful and/or failure indicators are not detected, the rocket is then removed to an offload pad as shown in step 316. In such case, the rocket may not enter the deceleration pool.

In step 308, a successful landing sequence may not be identified.

In other embodiments, an imminent failure may be identified prior to attempted engagement with the catch system. Rockets may present significant hazards such that landing rockets may be volatile, and a catastrophe may be imminent. For example, rockets may deplete their limited fuel reserves during reentry or landing before adequately concluding a landing sequence. Accordingly, the rocket may fall from the sky, or otherwise, collide with surrounding structures or the earth resulting in a loss of an expensive and critical asset as well as causing harm to infrastructure, assets, and/or lives. Additionally, rocket fuel is combustible and presents a potential risk of a significant loss to the rocket and other assets in proximity to the rocket.

As further example, in step 308 a failure may be identified if one or more failure indicators or events occur. These failure indicators or events may include the following: the speed and/or duration of the vehicle or landing sequence exceeds determined thresholds; the fuel reserves of the rocket fall below a predetermined threshold; an unexpected flame extends from the rocket; combustion occurs; or a collision between the rocket and an obstacle such that the orientation of the rocket shifts into an uncorrectable orientation.

In these and other instances, instead of identifying a success, in step 308 a failure may be identified in which case the method 300 moves to step 310 or 312. The method moves to step 310 if an imminent landing failure is anticipated. In step 310, the landing sequence is aborted in response to an identification of an unsuccessful landing sequence. Aborting the landing sequence may include one or more of the following procedures: positioning the rocket over the deceleration pool; removing the primary landing system structure from over the pool; deactivating the propulsion systems of the rocket and extinguishing any flames; and initiating an alarm. In some embodiments, the deceleration pool may be activated in response to an unsuccessful landing attempt. In such embodiments, step 310 may further comprise activating the deceleration pool as discussed above after one or more indicators or events are detected. In some embodiments, the pool and gas may be activated even in the absence of an anticipated failure, for example where the vehicle attempts to but unexpectedly fails to engage with the primary landing system, as described.

The method 300 then moves to step 312 in which the deceleration pool receives the landing vehicle. In some embodiments, the rocket may freely fall into the deceleration pool or may be guided into the deceleration pool via the vehicle's thrusters.

Furthermore, in some embodiments, the deceleration pool may have a uniform density profile allowing the rocket to land anywhere in the pool thereby mitigating impact damage to the rocket. In other embodiments, the deceleration pool may have a non-uniform or gradient density profile with a lower density in a landing region, such as underneath the landing hook or at the center of the deceleration pool, thereby guiding the rocket to the landing region. Furthermore, in some embodiments, the density profile of the deceleration pool may change over time. For example, the deceleration pool may initially have a uniform density profile and transition to a gradient density profile thereby allowing the rocket to land anywhere within the deceleration pool and then be guided to a desired location, such as the center of the deceleration pool.

In some embodiments, the method 300 may comprise an additional step of changing the density profile. In such embodiments the deceleration pool may be activated at step 304 to release the gas into the liquid according to a first desired density profile. The first desired density profile may be a uniform density profile to provide a uniform volume for the rocket to enter the deceleration pool at any position across the deceleration pool during step 312. At a subsequent step after the rocket falls into the deceleration pool, such as at step 312 or thereafter, the deceleration pool may be reactivated or changed to release the gas into the liquid according to a second desired density profile different from the first profile. The second profile may be a gradient density profile wherein the landing region, for example the center of the deceleration pool, has a lower density than the periphery of the deceleration pool for positioning, for example centering, the rocket within a desired location of the deceleration pool.

The method 300 then moves to step 314 in which the rocket is recovered from the deceleration pool. The deceleration pool may align the rocket about the center of the deceleration pool. In some embodiments, a crane may be implemented to securely remove the rocket. In other embodiments, the primary landing system may act as a crane comprising the hook configured to lower into the deceleration pool, securely engage with the rocket, and raise the rocket out of the liquid contained within the deceleration pool, as described above.

The method 300 then moves to step 316 in which the rocket is removed to the offload pad. In some embodiments, the primary landing system may include the hook tower, hook beam, and hook as described, where the hook is configured to engage with the rocket, the hook being supported by the hook tower and the hook beam. In such embodiments, the offload pad may be positioned adjacent to the hook tower wherein the hook tower may be configured to rotate about a vertical axis for moving the rocket from a landing position above the deceleration pool to a position above an offload pad. The rocket may then be lowered until resting upon the offload pad or on a transportation vehicle. The primary landing system may then disengage from the rocket.

The foregoing description details certain embodiments of the systems, devices, and methods disclosed herein. It will be appreciated, however, that no matter how detailed the foregoing appears in text, the systems, devices, and methods can be practiced in many ways. It should be noted that the use of particular terminology when describing certain features or aspects of the disclosure should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

It is noted that some examples above may be described as a process, which is depicted as a flowchart, a flow diagram, a structure diagram, or a block diagram. Although a flowchart may describe the operations as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc. When a process corresponds to a software function, its termination corresponds to a return of the function to the calling function or the main function.

The above description discloses several methods and materials of the present disclosure. This disclosure is susceptible to modifications in the methods and materials, as well as alterations in the fabrication methods and equipment. Such modifications will become apparent to those skilled in the art from a consideration of this disclosure or practice of the embodiments disclosed herein. Consequently, it is not intended that this disclosure be limited to the specific embodiments disclosed herein, but that it covers all modifications and alternatives coming within the true scope and spirit of the disclosure as embodied in the attached claims.

What is claimed is:

1. A system for receiving a landing rocket, the system comprising:
    a liquid deceleration system comprising:
        at least one storage tank comprising a gas; and
        a deceleration pool comprising:
            a volume defined by a foundation and a sidewall extending upward from the foundation a height of 200 feet or more;
            a liquid contained within the volume; and
            at least one injection manifold comprising a plurality of openings, the at least one injection manifold in fluid communication with the at least one storage tank and configured to inject the gas into the liquid through the plurality of openings.

2. The system of claim 1 further comprising a landing hook system disposed above the deceleration pool and configured to catch the landing rocket.

3. The system of claim 1 further comprising one or more valves in fluid communication with the at least one storage tank and the at least one injection manifold.

4. The system of claim 1, wherein the sidewall has a lateral dimension of 1000 feet or more.

5. The system of claim 1, wherein the liquid is water-based and comprises untreated water, freshwater, seawater, brine, saturated brine, or treated water comprising sodium hypochlorite, chlorine, or salt.

6. The system of claim 1, wherein the gas has a pressure exceeding the pressure of the liquid located at a bottom of the deceleration pool.

7. The system of claim 6, wherein the pressure of the gas is at least 1 MPa.

8. The system of claim 1, wherein the plurality of openings are radially disposed about a landing region of the deceleration pool.

9. The system of claim 1, wherein the liquid has a gradient density profile when gas is injected into the liquid through the plurality of openings.

10. The system of claim 9, wherein a first density of the liquid at a landing region of the deceleration pool is lower than a second density of the liquid adjacent to the sidewall.

11. A system for receiving a landing rocket, the system comprising:
    a liquid deceleration system comprising:
        at least one storage tank comprising a gas; and
        a deceleration pool comprising:
            a volume defined by a foundation and a sidewall extending upward from the foundation;
            a liquid contained within the volume; and
            at least one injection manifold comprising a plurality of openings, the at least one injection manifold in fluid communication with the at least one storage tank and configured to inject the gas into the liquid through the plurality of openings; and
    a landing hook system disposed above the deceleration pool and configured to catch the landing rocket.

12. The system of claim 11 further comprising one or more valves in fluid communication with the at least one storage tank and the at least one injection manifold.

13. The system of claim 11, wherein the sidewall has a lateral dimension of 1000 feet or more.

14. The system of claim 11, wherein the sidewall has a height of 200 feet or more.

15. The system of claim 11, wherein the liquid is water-based and comprises untreated water, freshwater, seawater, brine, saturated brine, or treated water comprising sodium hypochlorite, chlorine, or salt.

16. The system of claim 11, wherein the gas has a pressure exceeding the pressure of the liquid located at a bottom of the deceleration pool.

17. The system of claim 16, wherein the pressure of the gas is at least 1 MPa.

18. The system of claim 11, wherein the plurality of openings are radially disposed about a landing region of the deceleration pool.

19. The system of claim 11, wherein the liquid has a gradient density profile when gas is injected into the liquid through the plurality of openings.

20. The system of claim 19, wherein a first density of the liquid at a landing region of the deceleration pool is lower than a second density of the liquid adjacent to the sidewall.

* * * * *